United States Patent
Sun et al.

(10) Patent No.: US 9,533,385 B2
(45) Date of Patent: Jan. 3, 2017

(54) FLAT HEAT PIPE AND METHOD OF MANUFACTURING THE SAME

(71) Applicant: COOLER MASTER DEVELOPMENT CORPORATION, New Taipei (TW)

(72) Inventors: Chien-Hung Sun, New Taipei (TW); Chun Zhou, New Taipei (TW)

(73) Assignee: COOLER MASTER DEVELOPMENT CORPORATION, New Taipei (TW)

( * ) Notice: Subject to any disclaimer, the term of this patent is extended or adjusted under 35 U.S.C. 154(b) by 198 days.

(21) Appl. No.: 14/302,405

(22) Filed: Jun. 11, 2014

(65) Prior Publication Data

US 2014/0290063 A1    Oct. 2, 2014

Related U.S. Application Data

(62) Division of application No. 13/412,582, filed on Mar. 5, 2012, now abandoned.

(30) Foreign Application Priority Data

Jan. 20, 2012 (CN) .......................... 2012 1 0019541

(51) Int. Cl.
*F28D 15/00* (2006.01)
*B23P 15/26* (2006.01)
*F28D 15/02* (2006.01)
*F28D 15/04* (2006.01)

(52) U.S. Cl.
CPC ........... *B23P 15/26* (2013.01); *F28D 15/0233* (2013.01); *F28D 15/046* (2013.01); *Y10T 29/49353* (2015.01)

(58) Field of Classification Search
CPC ..... B23P 15/26; F28D 15/0233; F28D 15/046; Y10T 29/49353
See application file for complete search history.

(56) References Cited

U.S. PATENT DOCUMENTS

2012/0111540 A1 *    5/2012    Dai .................... B22F 3/004
165/104.26

* cited by examiner

*Primary Examiner* — Richard Chang
(74) *Attorney, Agent, or Firm* — Winston Hsu; Scott Margo

(57) ABSTRACT

A flat heat pipe includes a flat hollow pipe and a capillary structure. The flat hollow pipe has a first flat portion, a second flat portion and two arc portions, wherein the two arc portions are connected to both sides of the first and second flat portions. The capillary structure is formed in the flat hollow pipe. The capillary structure has a central portion and two edge portions, wherein the central portion is located on an inner wall of the first flat portion, the two edge portions are located on inner walls of the two arc portions respectively, and a thickness of the central portion is smaller than a thickness of each of the two edge portions.

3 Claims, 5 Drawing Sheets

FLAT HEAT PIPE AND METHOD OF MANUFACTURING THE SAME

CROSS REFERENCE TO RELATED APPLICATIONS

This is a division application of Ser. No. 13/412,582, now pending, filed on Mar. 5, 2012.

BACKGROUND OF THE INVENTION

1. Field of the Invention

The invention relates to a flat heat pipe and a method of manufacturing the same and, more particularly, to a flat heat pipe with a capillary structure and a method of manufacturing the flat heat pipe, wherein the interior of the capillary structure is thin and the exterior of the capillary structure is thick.

2. Description of the Prior Art

Heat dissipating device is a significant component for electronic products. When an electronic product is operating, the current in circuit will generate unnecessary heat due to impedance. If the heat is accumulated in the electronic components of the electronic product without dissipating immediately, the electronic components may get damage due to the accumulated heat. Therefore, the performance of heat dissipating device is a significant issue for the electronic product.

So far the heat dissipating device used in the electronic product usually consists of a heat pipe, a heat dissipating fin and a heat dissipating fan, wherein one end of the heat pipe contacts the electronic component, which generates heat during operation, the other end of the heat pipe is connected to the heat dissipating fin, and the heat dissipating fan blows air to the heat dissipating fin so as to dissipate heat. In general, the heat pipe mainly comprises circular heat pipe and flat heat pipe. The flat heat pipe mainly consists of a flat hollow pipe, a capillary structure and a working fluid. The conventional capillary structure is usually formed on an inner wall of a circular hollow pipe by a metal powder sintering process and then the circular hollow pipe is compressed to form the flat heat pipe. In general, if a wall thickness of a heat pipe is smaller than 2 mm, the heat pipe is called "ultra-thin heat pipe", and if a wall thickness of a heat pipe is larger than 2 mm, the heat pipe is called "thin heat pipe". However, no matter how the heat pipe is thinned, the heat pipe still has to reserve enough inner space for the working fluid to change between liquid state and gaseous state. Since the capillary structure occupies much more inner space of the heat pipe except the working fluid, how to effectively make use of limited inner space of the heat pipe (especially the thin or ultra-thin heat pipe) has become a significant design issue.

SUMMARY OF THE INVENTION

The invention provides a flat heat pipe with a capillary structure and a method of manufacturing the flat heat pipe, wherein the interior of the capillary structure is thin and the exterior of the capillary structure is thick, so as to solve the aforesaid problems.

According to an embodiment of the invention, a flat heat pipe comprises a flat hollow pipe and a capillary structure. The flat hollow pipe has a first flat portion, a second flat portion and two arc portions, wherein the two arc portions are connected to both sides of the first and second flat portions. The capillary structure is formed in the flat hollow pipe. The capillary structure has a central portion and two edge portions, wherein the central portion is located on an inner wall of the first flat portion, the two edge portions are located on inner walls of the two arc portions respectively, and a thickness of the central portion is smaller than a thickness of each of the two edge portions.

According to another embodiment of the invention, a method of manufacturing a flat heat pipe comprises steps of providing a circular hollow pipe and a T-shaped like wick, wherein the T-shaped like wick has a fan-shaped portion and a protruding portion protruding from the fan-shaped portion; inserting the T-shaped like wick into the circular hollow pipe such that the fan-shaped portion abuts against an inner wall of the circular hollow pipe and a segment difference space is formed between the protruding portion and the inner wall of the circular hollow pipe; forming a capillary structure in the segment difference space, wherein the capillary structure has a central portion and two edge portions and a thickness of the central portion is smaller than a thickness of each of the two edge portions; drawing the T-shaped like wick out of the circular hollow pipe; and compressing the circular hollow pipe so as to form a flat hollow pipe.

After compressing the circular hollow pipe so as to form the flat hollow pipe, the flat hollow pipe has a first flat portion, a second flat portion and two arc portions, the two arc portions are connected to both sides of the first and second flat portions, the central portion is located on an inner wall of the first flat portion, and the two edge portions are located on inner walls of the two arc portions respectively. Furthermore, after compressing the circular hollow pipe so as to form the flat hollow pipe, at least one of the two edge portions abuts against an inner wall of the second flat portion.

The aforesaid capillary structure maybe a sintered capillary structure, a mesh capillary structure or a compound capillary structure.

As mentioned in the above, the interior of the capillary structure is thin and the exterior of the capillary structure is thick such that one single vapor channel is formed in the flat hollow pipe of the flat heat pipe of the invention. Heat conduction of the single vapor channel can be raised effectively so as to achieve good heat exchange cycle. Furthermore, since the thickness of the central portion of the capillary structure is smaller than the thickness of each of the two edge portions, thermal resistance of the central portion of the capillary structure is lower than that of each of the two edge portions so as to enhance heat conduction while a heat source is attached to the center of the flat hollow pipe of the flat heat pipe.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
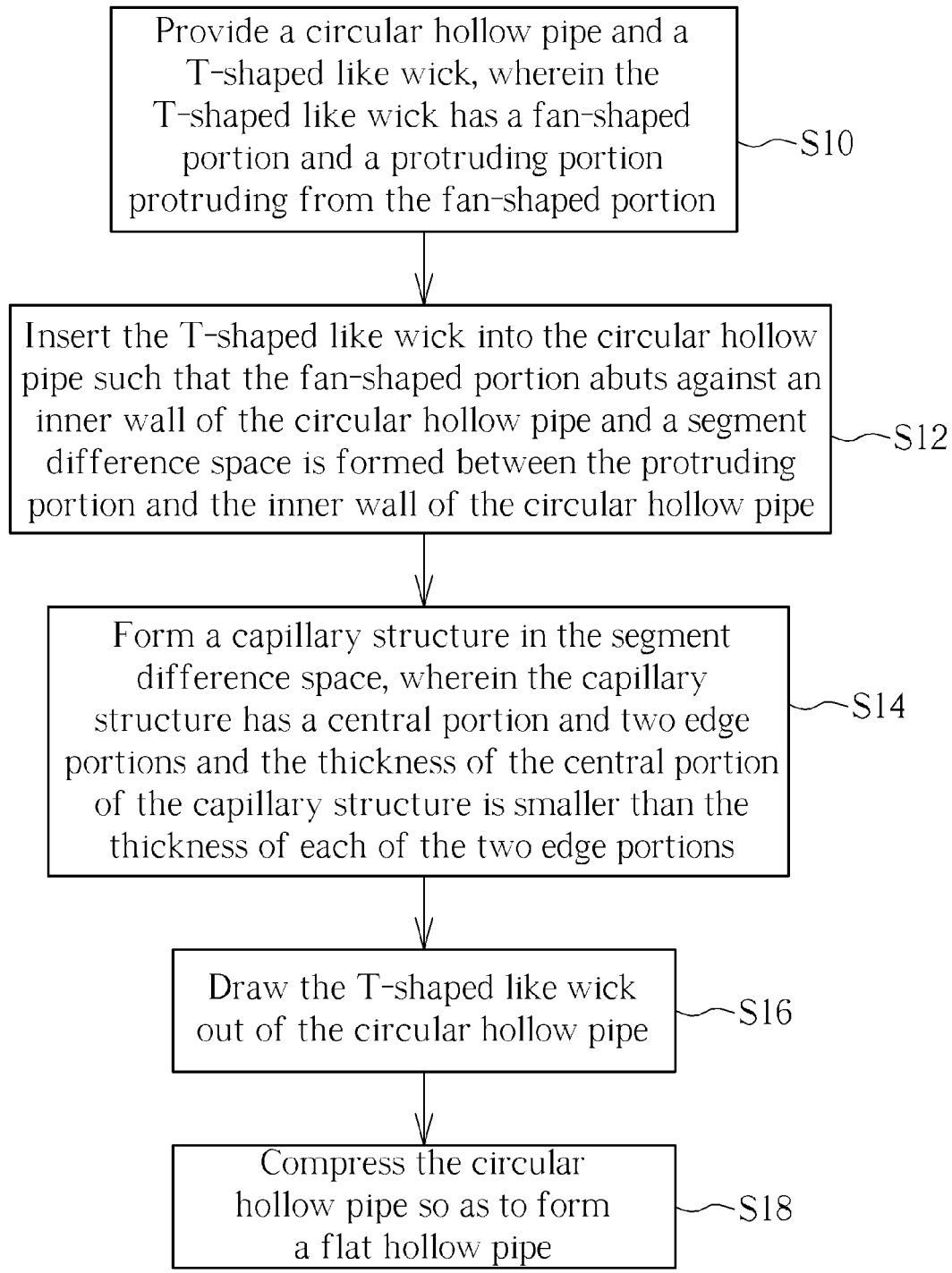
FIG. 1 is a flowchart illustrating a method of manufacturing a flat heat pipe according to an embodiment of the invention.
Figure 2:
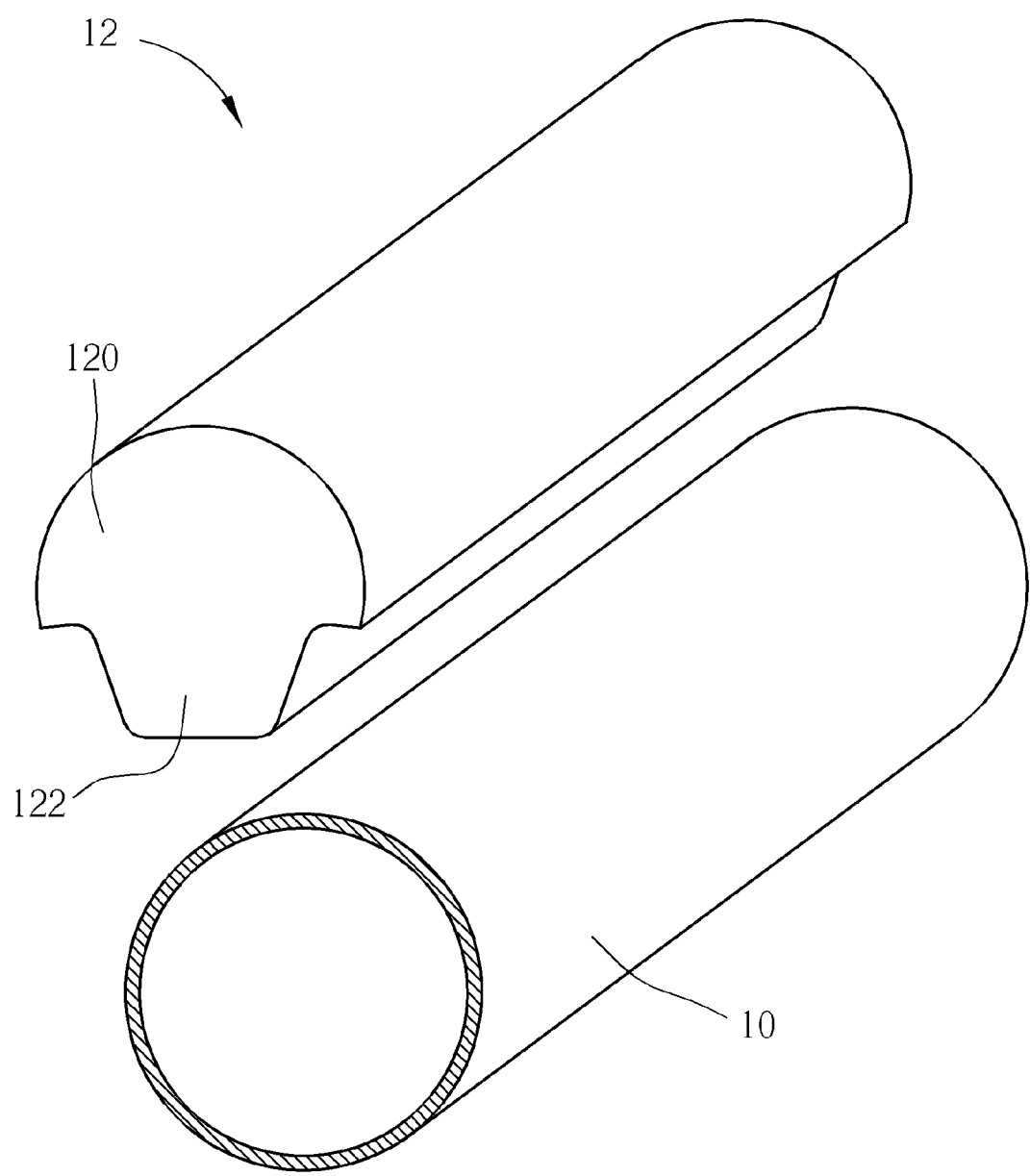
FIG. 2 is a perspective view illustrating a circular hollow pipe and a T-shaped like wick.
Figure 3:
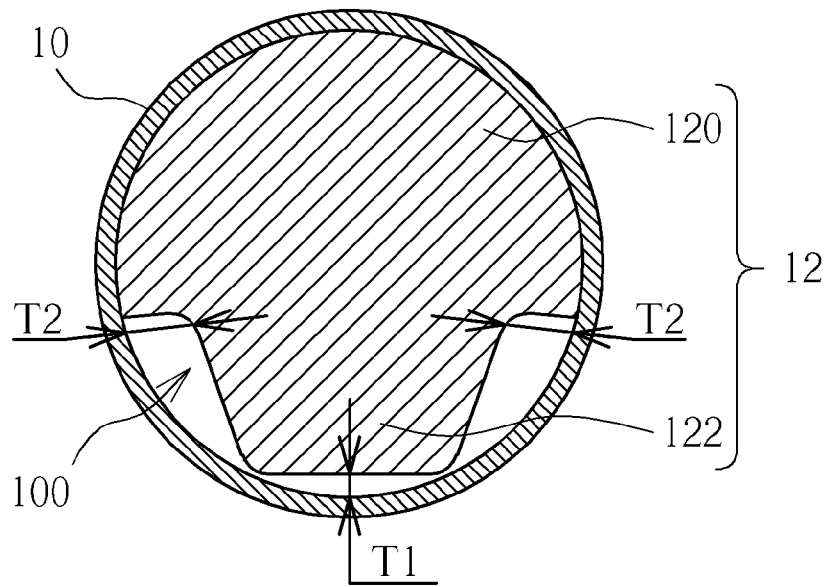
FIG. 3 is a front view illustrating the T-shaped like wick being inserted into the circular hollow pipe.
Figure 4:
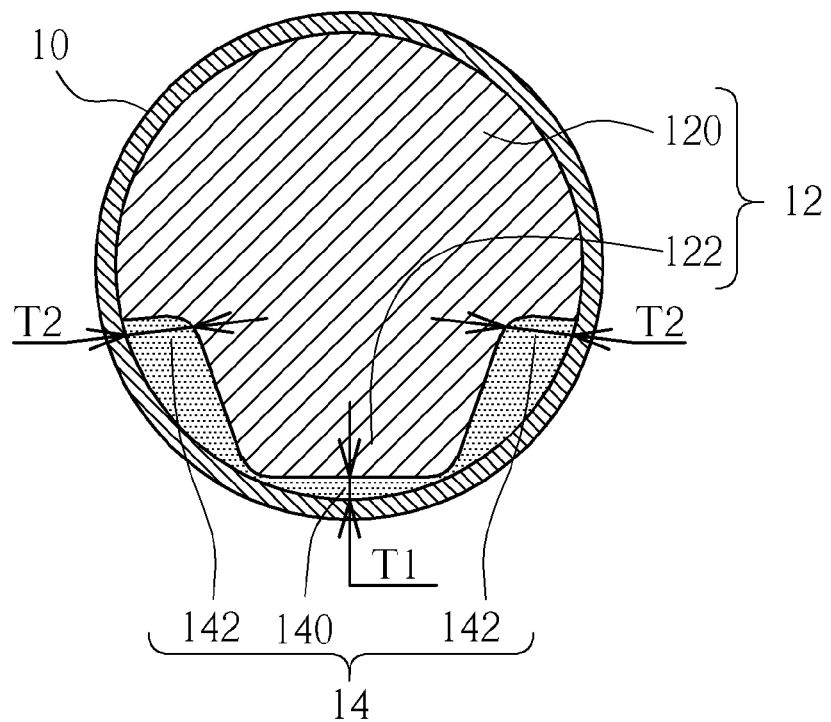
FIG. 4 is a front view illustrating a capillary structure being formed in a segment difference space.
Figure 5:
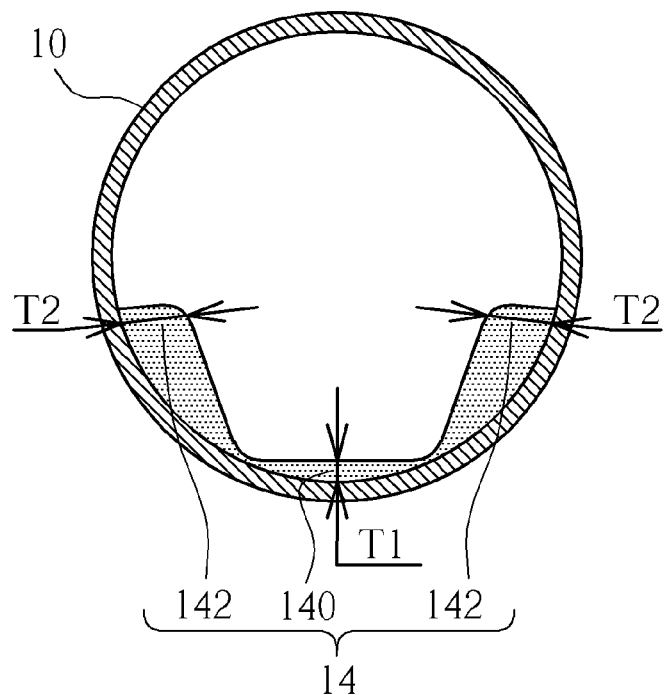
FIG. 5 is a front view illustrating the T-shaped like wick shown in FIG. 4 being drawn out of the circular hollow pipe.
Figure 6:
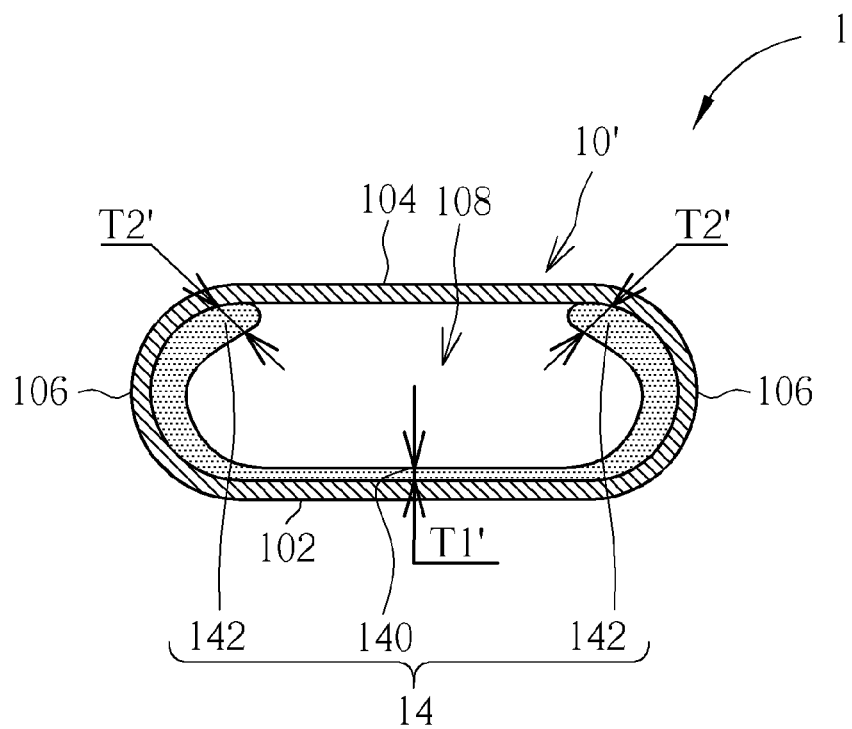
FIG. 6 is a front view illustrating the circular hollow pipe shown in FIG. 5 being compressed so as to form a flat hollow pipe.

Referring to FIGS. 1 to 6, FIG. 1 is a flowchart illustrating a method of manufacturing a flat heat pipe according to an embodiment of the invention, FIG. 2 is a perspective view illustrating a circular hollow pipe 10 and a T-shaped like wick 12, FIG. 3 is a front view illustrating the T-shaped like wick 12 being inserted into the circular hollow pipe 10, FIG. 4 is a front view illustrating a capillary structure 14 being formed in a segment difference space 100, FIG. 5 is a front view illustrating the T-shaped like wick 12 shown in FIG. 4 being drawn out of the circular hollow pipe 10, and FIG. 6 is a front view illustrating the circular hollow pipe 10 shown in FIG. 5 being compressed so as to form a flat hollow pipe 10'.

First of all, step S10 is performed to provide a circular hollow pipe 10 and a T-shaped like wick 12, wherein the T-shaped like wick 12 has a fan-shaped portion 120 and a protruding portion 122 protruding from the fan-shaped portion 120, as shown in FIG. 2. In this embodiment, the protruding portion 122 is trapezoid. However, in another embodiment, the protruding portion 122 may be arc-shaped or other shapes and it depends on practical applications.

Afterward, step S12 is performed to insert the T-shaped like wick 12 into the circular hollow pipe 10 such that the fan-shaped portion 120 abuts against an inner wall of the circular hollow pipe 10 and a segment difference space 100 is formed between the protruding portion 122 and the inner wall of the circular hollow pipe 10. As shown in FIG. 3, a thickness T1 of the center of the segment difference space 100 is smaller than a thickness T2 of both sides of the segment difference space 100.

Step S14 is then performed to form a capillary structure 14 in the segment difference space 100, wherein the capillary structure 14 has a central portion 140 and two edge portions 142, as shown in FIG. 4. A thickness of the central portion 140 of the capillary structure 14 is substantially equal to the thickness T1 of the center of the segment difference space 100, and a thickness of each of the two edge portions 142 of the capillary structure 14 is substantially equal to the thickness T2 of both sides of the segment difference space 100. Accordingly, the thickness T1 of the central portion 140 of the capillary structure 14 is smaller than the thickness T2 of each of the two edge portions 142. In this embodiment, the capillary structure 14 may be a sintered capillary structure, a mesh capillary structure or a compound capillary structure and it depends on practical applications.

Step S16 is then performed to draw the T-shaped like wick 12 out of the circular hollow pipe 10, as shown in FIG. 5.

Finally, step S18 is performed to compress the circular hollow pipe 10 so as to form a flat hollow pipe 10'. Consequently, the flat heat pipe 1 shown in FIG. 6 is manufactured completely. In practical applications, a working fluid (not shown), such as water or other fluids with low viscosity, is filled in the flat hollow pipe 10'. After compressing the circular hollow pipe 10 so as to form the flat hollow pipe 10', the flat hollow pipe 10' has a first flat portion 102, a second flat portion 104 and two arc portions 106, wherein the two arc portions 106 are connected to both sides of the first flat portion 102 and the second flat portion 104. As shown in FIG. 6, the central portion 140 of the capillary structure 14 is located on an inner wall of the first flat portion 102, and the two edge portions 142 of the capillary structure 14 are located on inner walls of the two arc portions 106 respectively so that the capillary structure 14 is U-shaped. Furthermore, after compression and deformation, a thickness T1' of the central portion 140 is still smaller than a thickness T2' of each of the two edge portions 142. Since the interior of the capillary structure 14 is thin and the exterior of the capillary structure 14 is thick, one single vapor channel 108 is formed in the flat hollow pipe 10' of the flat heat pipe 1. Heat conduction of the single vapor channel 108 can be raised effectively so as to achieve good heat exchange cycle.

Moreover, after compressing the circular hollow pipe 10 so as to form the flat hollow pipe 10', the two edge portions 142 of the capillary structure 14 abut against an inner wall of the second flat portion 104 of the flat hollow pipe 10'. Accordingly, the two edge portions 142 of the capillary structure 14 can support the flat hollow pipe 10' so as to prevent the flat hollow pipe 10' from cracking due to compression. It should be noted that the capillary structure 14 can support the flat hollow pipe 10' while at least one of the two edge portions 142 abuts against the inner wall of the second flat portion 104, so the invention is not limited to the embodiment shown in FIG. 6.

Figure 7:
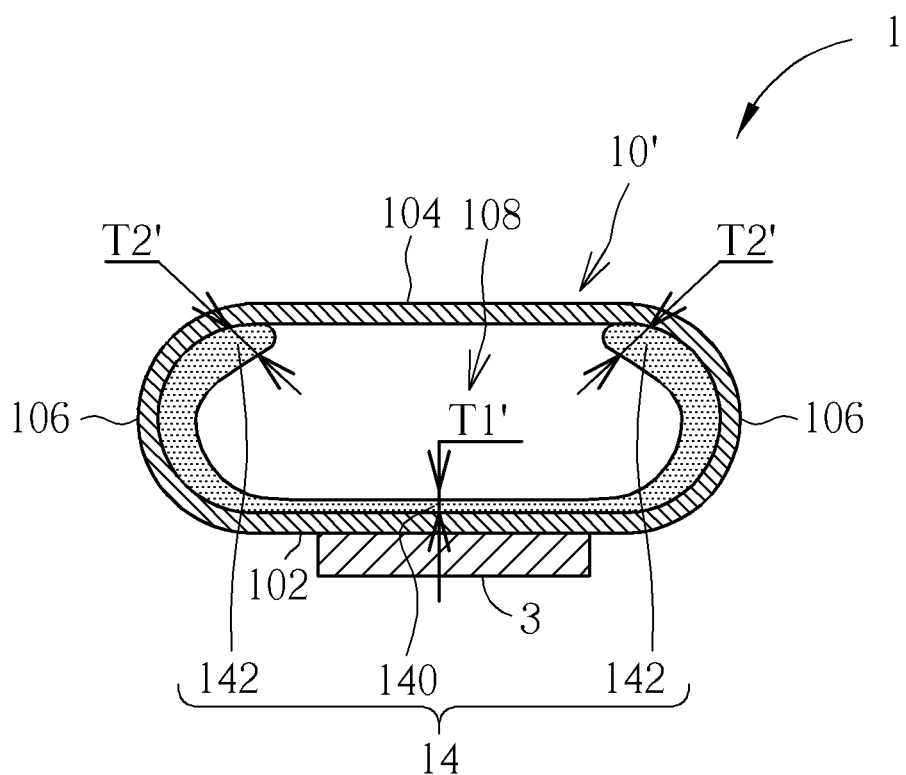
FIG. 7 is a schematic diagram illustrating a heat source being attached to the flat heat pipe shown in FIG. 6.

Referring to FIG. 7, FIG. 7 is a schematic diagram illustrating a heat source 3 being attached to the flat heat pipe 1 shown in FIG. 6. As shown in FIG. 7, the heat source 3 is usually attached to the center below the first flat portion 102 of the flat heat pipe 1. Since the thickness T1' of the central portion 140 of the capillary structure 14 is smaller than the thickness T2' of each of the two edge portions 142, thermal resistance of the central portion 140 of the capillary structure 14 is lower than that of each of the two edge portions 142 so as to enhance heat conduction while the heat source 3 is attached to the center below the first flat portion 102 of the flat heat pipe 1.

Compared with the prior art, the interior of the capillary structure is thin and the exterior of the capillary structure is thick such that one single vapor channel is formed in the flat hollow pipe of the flat heat pipe of the invention. Heat conduction of the single vapor channel can be raised effectively so as to achieve good heat exchange cycle. Furthermore, since the thickness of the central portion of the capillary structure is smaller than the thickness of each of the two edge portions, thermal resistance of the central portion of the capillary structure is lower than that of each of the two edge portions so as to enhance heat conduction while a heat source is attached to the center of the flat hollow pipe of the flat heat pipe.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of manufacturing a flat heat pipe comprising:
   providing a circular hollow pipe and a T-shaped like wick, wherein the T-shaped like wick has a fan-shaped portion and a protruding portion protruding from the fan-shaped portion;
   inserting the T-shaped like wick into the circular hollow pipe such that the fan-shaped portion abuts against an inner wall of the circular hollow pipe and a segment difference space is formed between the protruding portion and the inner wall of the circular hollow pipe;

forming a capillary structure in the segment difference space, wherein the capillary structure has a central portion and two edge portions and a thickness of the central portion is smaller than a thickness of each of the two edge portions;

drawing the T-shaped like wick out of the circular hollow pipe; and compressing the circular hollow pipe so as to form a flat hollow pipe;

wherein after compressing the circular hollow pipe so as to form the flat hollow pipe, the flat hollow pipe has a first flat portion, a second flat portion and two arc portions, the two arc portions are connected to both sides of the first and second flat portions, the central portion is located on an inner wall of the first flat portion, the two edge portions are located on inner walls of the two arc portions respectively, and at least one of the two edge portions abuts against an inner wall of the second flat portion.

2. The method of claim 1, wherein the capillary structure is U-shaped.

3. The method of claim 1, wherein the capillary structure is a sintered capillary structure, a mesh capillary structure or a compound capillary structure.

\* \* \* \* \*